(12) United States Patent
Hou et al.

(10) Patent No.: US 6,393,498 B1
(45) Date of Patent: May 21, 2002

(54) SYSTEM FOR REDUCING PROCESSOR WORKLOADS WITH MEMORY REMAPPING TECHNIQUES

(75) Inventors: Chien-Tzu Hou, Fremont, CA (US); Hsiu-Ying Hsu, Taipei (TW)

(73) Assignee: Mentor ARC Inc., Fremont, CA (US)

( * ) Notice: Subject to any disclaimer, the term of this patent is extended or adjusted under 35 U.S.C. 154(b) by 0 days.

(21) Appl. No.: 09/260,637

(22) Filed: Mar. 2, 1999

(51) Int. Cl.[7] .................................................. G06F 3/00
(52) U.S. Cl. ............................... 710/1; 710/8; 710/15; 710/62; 710/72; 710/131
(58) Field of Search ........................... 710/1, 8, 15, 36, 710/62, 72, 19, 29, 52, 63, 64, 65, 73, 74, 131

(56) References Cited

U.S. PATENT DOCUMENTS

| | | | | |
|---|---|---|---|---|
| 4,847,750 A | * | 7/1989 | Daniel ........................ | 364/200 |
| 5,027,273 A | * | 6/1991 | Letwin ....................... | 364/200 |
| 5,396,619 A | * | 3/1995 | Walton ....................... | 395/575 |
| 5,630,097 A | * | 5/1997 | Orbits et al. ................ | 711/165 |
| 5,671,439 A | * | 9/1997 | Klein et al. .................... | 710/1 |
| 5,682,310 A | * | 10/1997 | Pedneau et al. ............ | 364/280 |
| 5,687,343 A | * | 11/1997 | Fectau et al. ............... | 711/202 |
| 5,710,939 A | * | 1/1998 | Ballachino et al. ........... | 710/1 |
| 5,754,817 A | * | 5/1998 | Wells et al. ................. | 711/203 |
| 6,049,852 A | * | 4/2000 | Oba et al. .................... | 711/145 |
| 6,105,101 A | * | 8/2000 | Hester et al. ............... | 710/260 |

* cited by examiner

Primary Examiner—Jeffrey Gaffin
Assistant Examiner—Rijue Mai
(74) Attorney, Agent, or Firm—Townsend and Townsend and Crew LLP (57) ABSTRACT

A data-processing system with an enhanced system controller supporting memory-remapping function. The system controller has an access control circuit, a page/remapping management circuit and an open/remapped address table. The open/remapped address table is used to store mapping tables for indicating the mapping relation of memory segments and addresses dedicated to peripheral devices. The page/remapping management circuit should maintain and use the mapping tables in various operating mode. In addition, the page/remapping management circuit can redirect access requests to proper memory segments according to the mapping table corresponding to the current operating mode. Therefore, peripheral devices can effectively access and process the data stored in various memory segments by the change of the operating modes, not by physical data transfer.

7 Claims, 8 Drawing Sheets

SYSTEM FOR REDUCING PROCESSOR WORKLOADS WITH MEMORY REMAPPING TECHNIQUES

BACKGROUND OF THE INVENTION

1. Field of the Invention

The present invention relates to a data-processing system and method using memory-remapping technique. Such invention is designed to reduce the workload of processors, such as central processing units (CPUs) in personal computers, and to serve the data transfer requirement of various peripheral devices.

2. Description of the Related Art

Memory is an infrastructure block in data-processing or computing systems (hereafter is referred to as "the System"). Under normal operation, the System must spend a lot of time to move data from and write data into the memory. Therefore, how to effectively access memory is a critical issue when assessing the System's overall performance.

Figure 1:
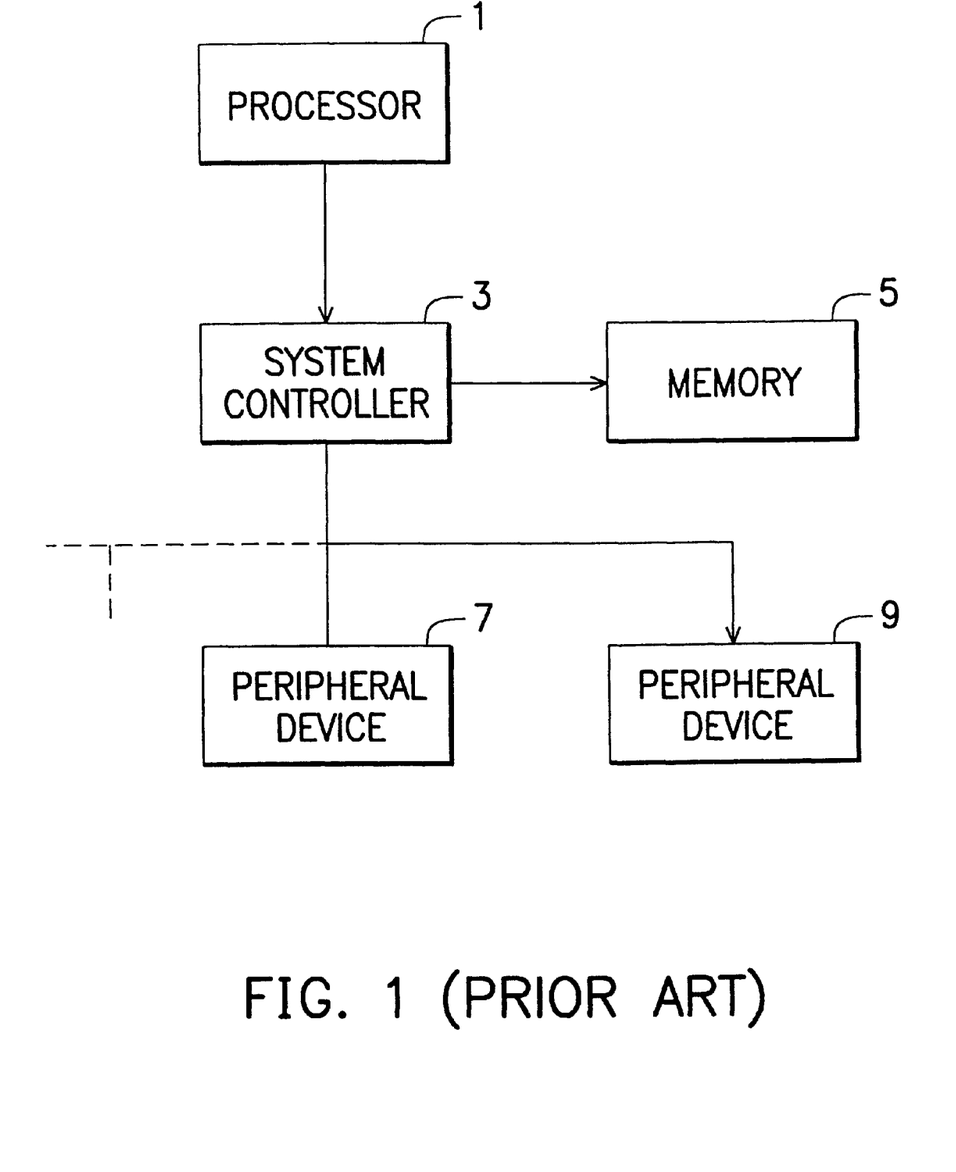
FIG. 1 (Prior Art) is a block diagram that illustrates the structure of a conventional computing system or a data-processing system.

FIG. 1 (Prior Art) is a block diagram which illustrates the fundamental structure of the System. As shown in FIG. 1, the System includes processor 1, system controller 3, memory 5 and several peripheral devices such as peripheral device 7 and peripheral device 9. Processor 1 is the key component in the System for performing various data-processing operations, such as arithmetic and logical operations, and data transfer operations. Memory 5, usually implemented by dynamic random access memories (hereafter referred as DRAMs), is a main storage device for storing major program codes and data. Peripheral devices 7 and 9 are used to communicate with the exterior or supplement extra functions to the System. Some popular peripheral devices, such as graphic cards, modems with I/O interface and Moving Picture Experts Group's cards (MPEG cards), are prevalent in most computing or data-processing systems. System controller 3, which is installed between processor 1, memory 5 and peripheral devices 7 and 9, is used to link processor 1 and the peripheral devices. In addition, system controller 3 provides an accessing scheme for memory 5 to help processor 3 and the peripheral devices to access memory 5. From the viewpoint of memory accessing, system controller 3 should handle all requests ready for accessing memory 5 in the predefined timing, from either processor 1 or peripheral devices 7 and 9. It is noticed that some essential components in modern computer systems are omitted from the illustrated system architecture, such as caches in the memory hierarchy, shown in FIG. 1.

Figure 2:
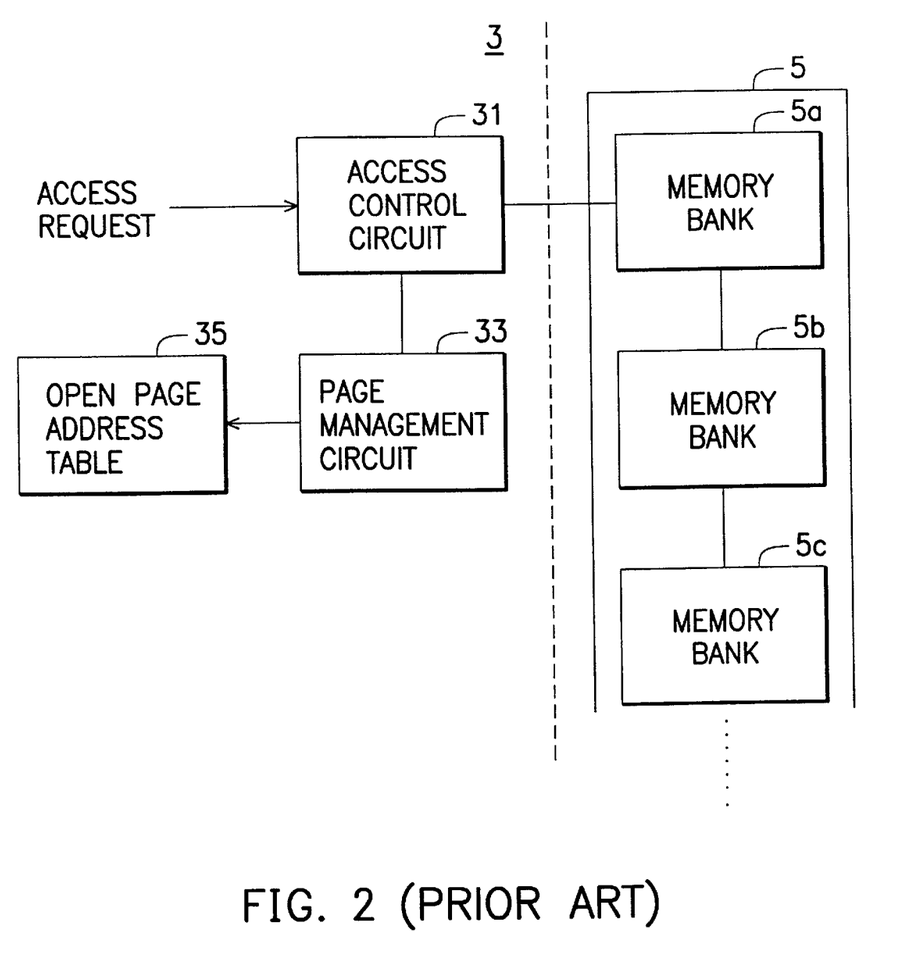
FIG. 2 (Prior Art) shows the detail structure of a system controller and a main memory in the computing system or data-processing system.

FIG. 2 (Prior Art) illustrates detail structures of system controller 3 and memory 5 in the System. In the modern memory technology, physical memory devices, such as DRAMs, are usually divided into several memory banks that can be accessed independently. As shown in FIG. 2, memory 5 is consisted of memory bank 5a, memory bank 5b, memory bank 5c, and so on, which can be accessed independently under the control of dedicated access controlling signals (not shown). On the other hand, FIG. 2 also illustrates three memory access components of system controller 3, including access control circuit 31, page management circuit 33 and open-page address table (stored in memories) 35. Access control circuit 31 is responsible for receiving external access requests, which come from either processor 1 or other peripheral devices. It is also responsible for physically executing the access control protocol of memory 5. Page management circuit 33 helps the access control circuit 31 in access controlling, especially in page management. Each page of memory 5 contains a fixed number of bytes that can be accessed in the faster operation mode. The byte number of each page depends on the practical application, usually about 32 bytes or more. If a page is "open", it means that all memory locations contained in this page can be accessed (esp. the writing operation) faster than those contained in "Non open" pages since pre-fetch operations are not required. Open-page address table 35, which is implemented by memory devices, is used to memorize the addressing information of all "open" pages in memory 5. Generally speaking, page management circuit 33 can properly alter all the addressing information that is stored in open-page address table 35 according to the physical access operations of access control circuit 31. On the other hand, page management circuit 33 also assists access control circuit 31 to effectively access to memory 3, with reference to the addressing information of all open pages maintained in the open-page address table 35.

Figure 3:
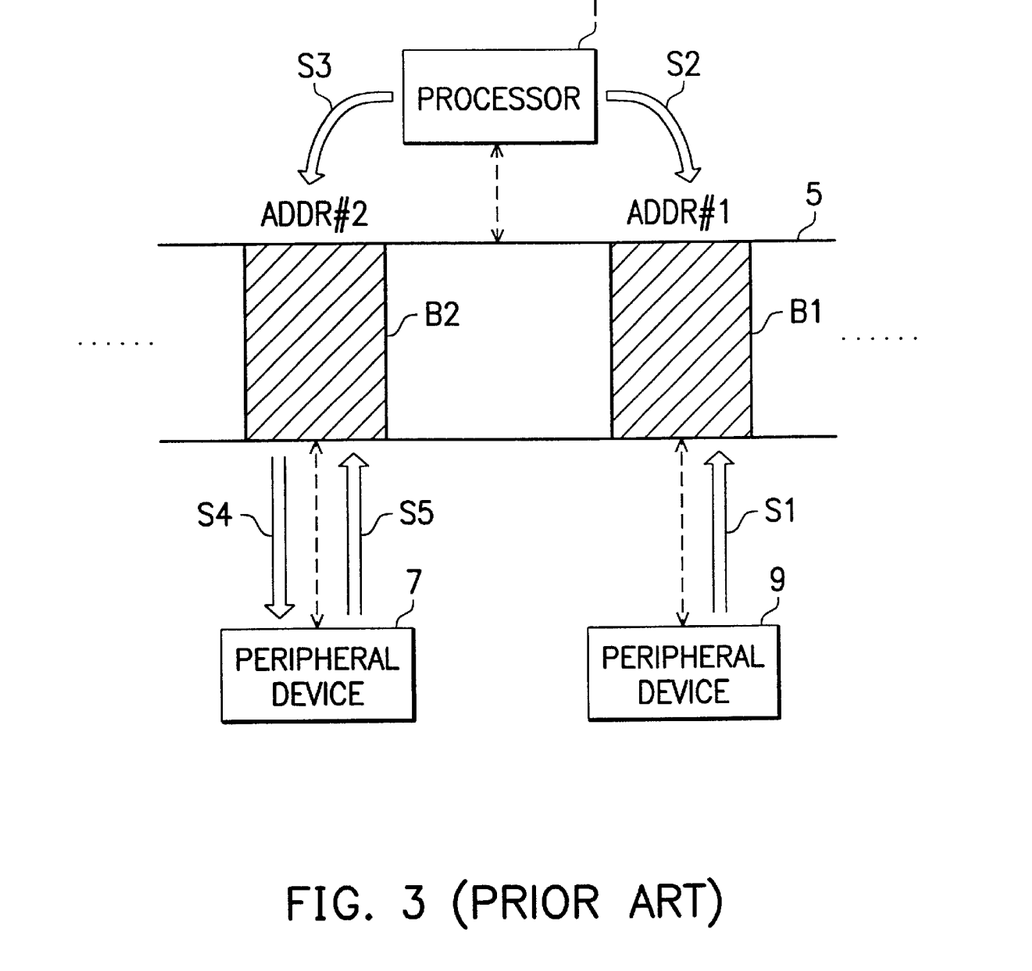
FIG. 3 (Prior Art) shows the schematic system diagram of a conventional accessing example, in which one peripheral device provides the System with the specific data and the other peripheral device performs an operation on these specific data.

In the system architecture shown in FIG. 1, processor 1 and other peripheral devices have to frequently access to the required storage locations of memory 5 to perform desired applications. FIG. 3 (Prior Art) shows the schematic system diagram of such an access example, in which peripheral device 9 provides the System with specific data and then peripheral device 7 performs an operation on these specific data. The example illustrated in FIG. 3 can be thought of as the case that a modem device (i.e., peripheral device 9) downloads an archived video file from the Internet, such as one encoded by the MPEG scheme, and the System employs a dedicated MPEG card (i.e., peripheral device 7) to decode or recover the video data. In general system architecture, each of the peripheral devices is assigned with a dedicated segment of memory used to communicating with each other. In FIG. 3, peripheral device 7 accesses memory segment B2 by using addresses ADDR#2 that are dedicated to peripheral device 7; the peripheral device 9 accesses memory segment B1 by addresses ADDR#1 that are dedicated to peripheral device 9.

In the conventional data-processing system, there are five steps required in this example, which are denoted as S1~S5, respectively. To demonstrate the whole process, these steps are sequentially described as follows. In step S1, peripheral device 9 stores data, which may be an archived file, to the memory segment B1 mapping to the addresses ADDR#1. Next, processor 1 must move the inputted data stored in memory segment B1 to memory segment B2 mapping to the addresses ADDR#2 that are dedicated to peripheral device 7. Accordingly, processor 1 reads the data stored in memory segment B1 (step S2) and writes the data to the memory segment B2 (step S3). It is obvious that the workload of processor 1 increases since processor 1 must involve in the process of moving data. Finally, peripheral device 7 can retrieve the data currently stored in memory segment B2 (step S4), perform the desired operation on these data, such as MPEG decoding, and then write the resulting data back to memory segment B2 (step S5).

The drawback of conventional memory access mechanism is twofold. First, processor 1 must involve itself in the process of moving data between two memory segments that are individually assigned to two different peripheral devices. It means that the processor 1 must waste time to execute the required data transfer operations and delay other necessary tasks. Second, moving data from memory segment B1 to memory segment B2 is a time-consuming process. Accordingly, it is obvious that the overall system performance will be degraded due to the task of moving data between two memory segments in such an application.

SUMMARY OF THE INVENTION

An object of the present invention is to provide a method and system for facilitating data exchange between two isolated memory segments and reducing the workload and the processing time of the system processor, thereby increasing the overall performance of the System.

The present invention achieves this objective by providing an enhanced system controller that supports memory-remapping technology to the System. The memory device in the System contains a first memory segment (or first set of physical storage locations) and a second memory segment (or second sets of physical storage locations). The system controller is operated under two operating modes. In the first operating mode, also called a normal mode, the system controller maps a first set of addresses that is dedicated to the first peripheral device to the first memory segment, and maps a second set of addresses that is dedicated to the second peripheral device to the second memory segment. Such mapping relationship is the same as that in the conventional case. In the second operation mode, also called a remapping mode, the system controller changes the original relationship of the addresses to the memory segments. That is, the first set of addresses dedicated to the first peripheral device is remapped to the second memory segment and the second set of the addresses dedicated to the second peripheral device is remapped to the first memory segment. Accordingly, the second peripheral device can access the first memory segment involving data previously processed by the first peripheral device without data transfer.

Switching from the normal mode to the remapping mode is triggered by a first control signal, which can be activated in response to the case that the first peripheral device finishes accessing the first memory segment in the normal mode. Similarly, switching from the remapping mode back to the normal mode is triggered by a second control signal, which can be activated in response to the case that the second peripheral device finishes accessing the first memory segment in the remapping mode.

Furthermore, the system controller consists of an accessing device, a storage device (embedded memories) and a controlling device. The accessing device is responsible for accessing a memory device in response to access requests issued by peripheral devices. The storage device is responsible for storing a first mapping table and a second mapping table indicating the relationship of memory segments to different memory address sets. The controlling device, which is coupled to the storage device and the accessing device, must perform the following two functions. The first function is to pick up the required mapping table defining the relationship of the addressing information contained in the input requests to the memory segments from the storing device in response to the current operating mode. The second function is to cooperate with the accessing device in actually accessing the memory device by referring to the picked-up mapping table. Therefore, the memory segments, more specifically, the data stored therein, can be readily accessed by different peripheral devices in the different operating modes. No physical data transfer is required.

Moreover, the present invention provides a general processing access method requested between the first peripheral device, second peripheral device and memory device to reduce possibility of physical data transfer. First, the first set of addresses dedicated to the first peripheral device is mapped to one of the memory segments within the memory device. Then the first peripheral device can write data to this memory segment using the first set of the addresses. When the first peripheral device finishes its task, the second set of the addresses dedicated to the second peripheral device is remapped to this memory segment in place of the first set. Therefore, the second device can easily read data from this memory segment using the second set of the addresses. No data transfer between two different memory segments is needed in such process.

DETAILED DESCRIPTION OF THE PREFERRED EMBODIMENTS

The present invention employs the memory-remapping technique to facilitate information exchange between various peripheral devices in computing systems or data-processing systems. Since a system controller can access both main memory and various peripheral devices and control physical access to the main memory, it is preferable that the memory-remapping function is directly implemented in the system controller. The details of the preferred embodiment in accordance with the present invention are described as follows with reference to accompanying drawings.

Figure 4:
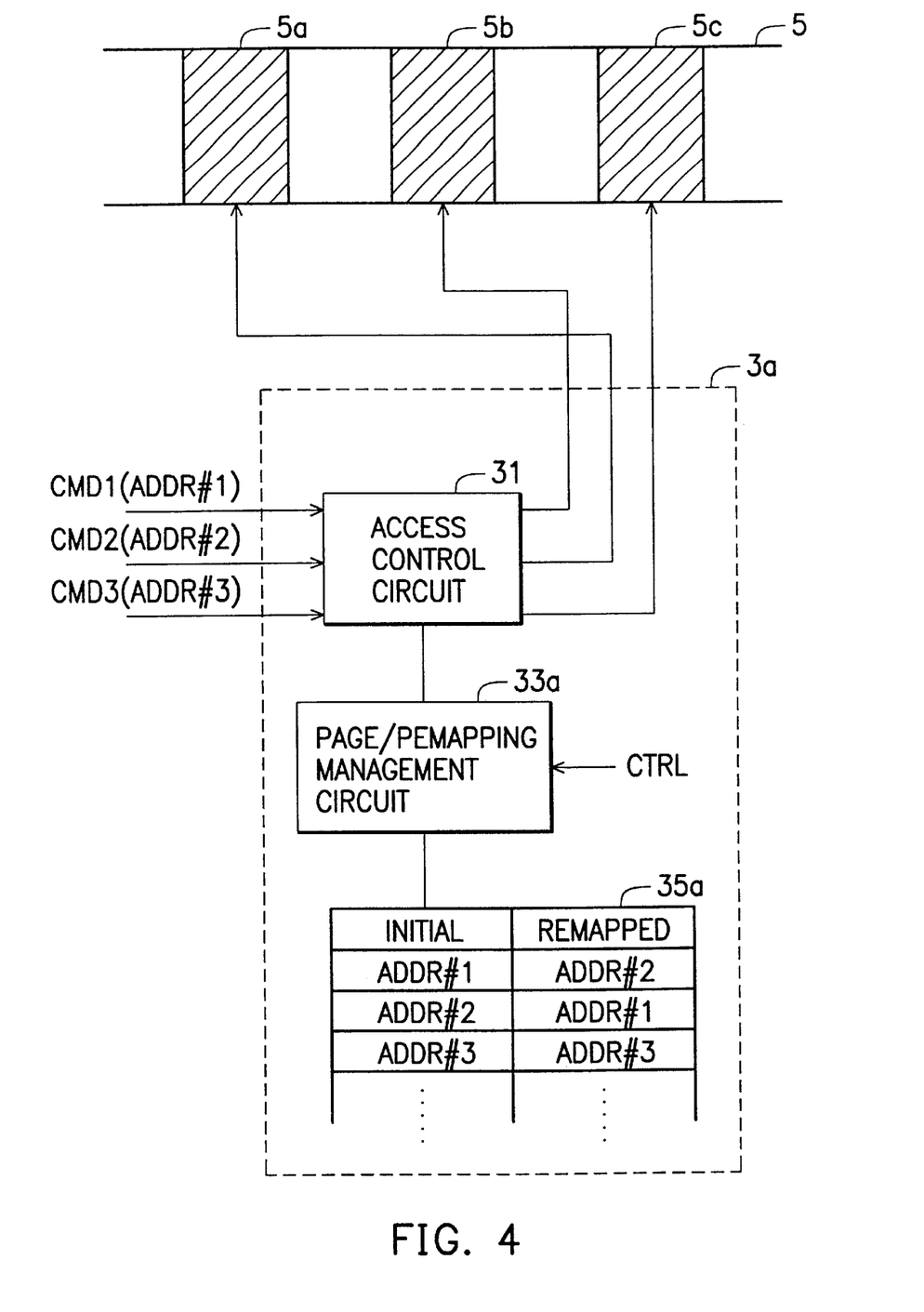
FIG. 4 is a schematic block diagram that shows architecture of a system controller in accordance with the embodiment of the present invention.

FIG. 4 is a schematic block diagram showing the architecture of a novel system controller 3a supporting the memory-remapping function. In FIG. 4, the system controller 3a contains access control circuit 31, page/remapping management circuit 33a and open/remapping address table 35a. The function of access control circuit 31 is the same as that of access control circuit 31 in FIG. 2. However, functions of page/remapping management circuit 33a and open/remapped address table 35a are slightly different from those of page management circuit 33 and open-page address table 35. As a result, they are attached by different notations.

As described in the prior art, access control circuit 31 is responsible for physically accessing memory 5 according to the instructions contained in the access requests issued by various peripheral devices. In FIG. 4, CMD1, CMD2 and CMD3 represent different instructions. In this embodiment, access requests CMD1, CMD2 and CMD3 contain different addresses ADDR#1, ADDR#2 and ADDR#3 which belong to the address ranges dedicated to different peripheral devices, respectively. From the viewpoint of the peripheral devices, they are trying to access the memory segments mapping to these addresses ADDR#1, ADDR#2 and ADDR#3, respectively. Assume that the addresses ADDR#1, ADDR#2 and ADDR#3 are mapped to memory segments 5a, 5b and 5c in the initial settings of the System.

Open/remapped address table 35a is used to maintain the mapping relationship of the addressing information contained in the access requests to physical locations of memory 5. More specifically, open/remapped address table 35a should clearly define how to map different addresses ADDR#1, ADDR#2 and ADDR#3 to corresponding physical storage locations of memory 5, such as segments 5a~5c. In this embodiment, open/remapped address table 35a stores two mapping tables, including an initial mapping table used in a normal operating mode (marked by INITIAL) and a remapped mapping table used in a remapping operating mode (marked by REMAPPED). Although there are only two mapping tables defined in this embodiment, it is noticed that open/remapped address table 35a is capable of containing more mapping tables that are applicable to different default operating modes if necessary. In addition, open/remapped address table 35a can be readily implemented using the existing open-page address memory device of the system controller.

Page/remapping management circuit 33a is a key component of system controller 3a and can be implemented by adding the conventional page management circuit with additional circuitry pertaining to remapping function. There are two necessary jobs for page/remapping management circuit 33a. The first job is to cooperate with access control circuit 31 in actually accessing memory 5 by referring to information contained in the open/remapped address table 35a. The second job is to select a mapping table from open/remapping address table 35a for indicating the mapping relationship between memory segments 5a–5c and addresses ADDR#1~ADDR#3 in the current operating mode. More specifically, according to input control signal CTRL, page/remapping management circuit 33a can switch the operating modes of system controller 3a. As described above, in the normal operating mode the initial mapping table indicating pre-defined mapping relationship is applied. On the other hand, the remapped table is applied in the remapping operating mode.

Accordingly, in the normal operating mode, addresses ADDR#1~ADDR#3 are one-to-one mapped to memory segments 5a~5c, respectively. That is, access request CMD1 can access the memory segment 5a through addresses ADDR#1 and access request CMD2 can access the memory segment 5b through addresses ADDR#2 under the control of access control circuit 31. However, the mapping relationship of memory segments to address will be varied in different operating modes. According to the remapped address table of open/remapped address table 35a, addresses ADDR#2 should be mapped to memory segment 5a, addresses ADDR#1 should be mapped to memory segment 5b and addresses ADDR#1 should be mapped to memory segment 5c. Therefore, access request CMD1 involving access addresses ADDR#1 physically accesses memory segment 5b and access request CMD2 involving access addresses ADDR#2 accesses the memory segment 5a in such mode. Accordingly, it is obvious that peripheral devices can access and process data stored in different memory segments by the change of the operating mode instead of physical data transfer. Changing the current operating mode can be done by the system controller independently and automatically. In other words, the function of swapping mapping relationship is transparent to users and application programs of the System. The user does not need to activate the function manually as some applications are running. Such processing method can effectively lower the workload of processors and save much time on data transfer between various memory segments.

It is noticed that the remapping example shown in FIG. 4 is not intended to limit the present invention. Remapping parameters, such as the number and the contents of remapping tables, can be modified to fit various situations of physical applications. Page/remapping management circuit 33a can utilize mapping information stored in open/remapped address table 35a by following the command pertaining to control signal CTRL. In the remapping mode, page/remapping management circuit 33a can redirect addressing information pertaining to an access request received by access control circuit 31 to a memory segment different from the usual one, by referring to the remapping table contained in the open/remapped page address table 35a.

Figure 5A:
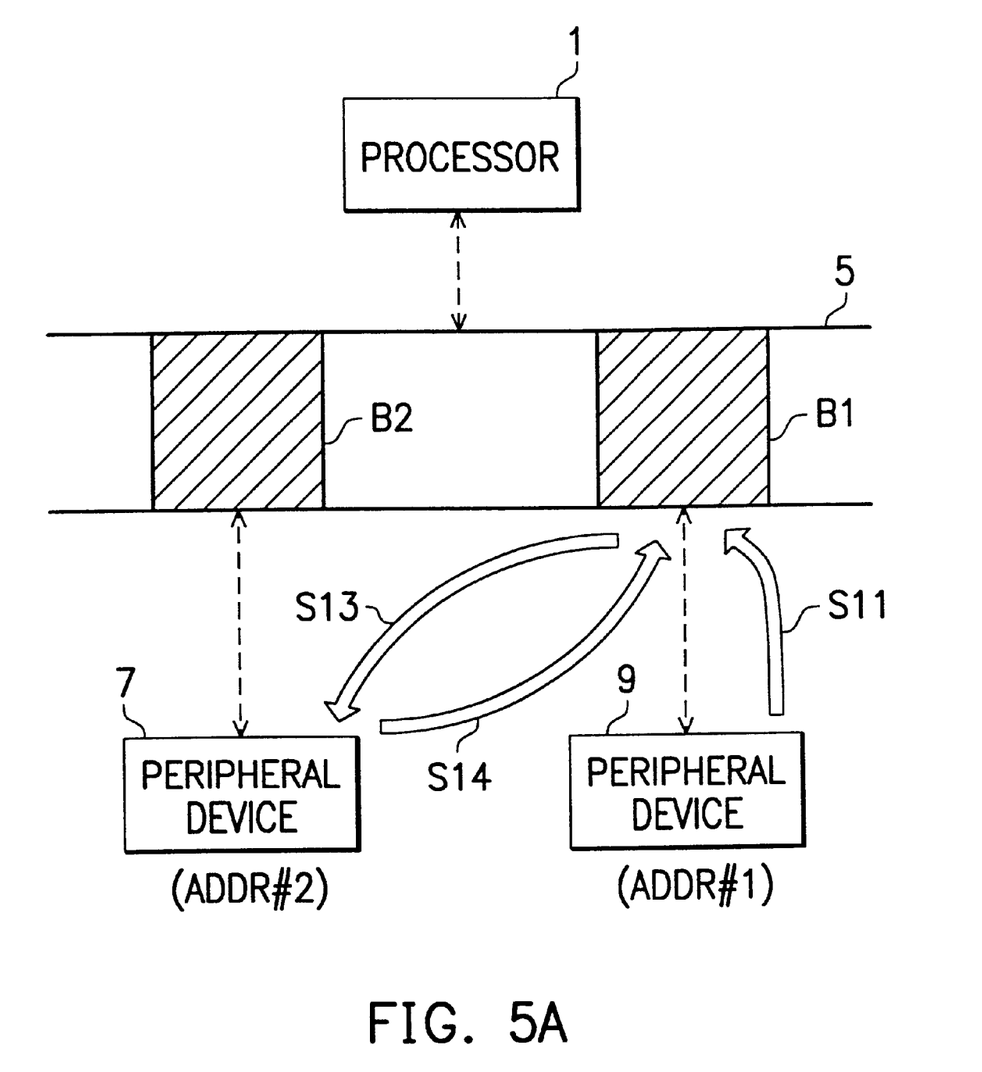
FIG. 5A shows the schematic system diagram of an accessing example that is the same as the conventional one in the prior art section, in which one peripheral device provides the System with the specific data and the other peripheral device performs an operation on these specific data.
Figure 5B:
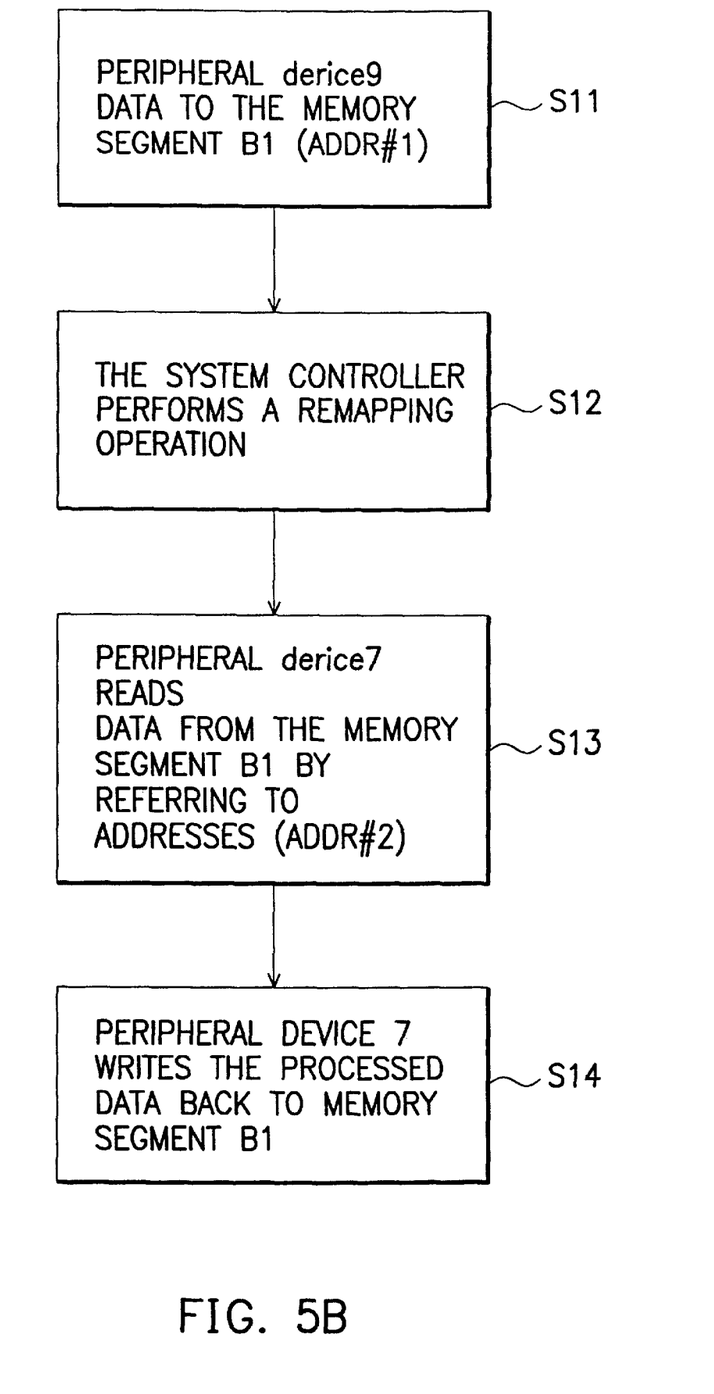
FIG. 5B is a flowchart that shows detailed steps of accessing example in FIG. 5A.

FIG. 5A shows a schematic diagram of an accessing example, in which a system controller with memory-remapping function is involved. Basically, the accessing example shown in FIG. 5A is similar to the conventional case shown in FIG. 2. That is, the peripheral device 9 stores specific data to memory segment B1 and the peripheral device 7 retrieves these specific data, processes them and writes the resulting data back. FIG. 5A shows detail steps of this accessing example, which are marked by S11, S12 (not shown), S13 and S14. The details of these steps in the flowchart of FIG. 5B are described as follows.

In step S11, peripheral device 9 writes data to memory segment B1, which are currently addressed by addresses ADDR#1 dedicated to peripheral device 9. Meanwhile, the peripheral device 7 accesses memory segment B2 that is currently addressed by addresses ADDR#2. The mapping relations between (B1, ADDR#1) and (B2, ADDR#2) are controlled and managed by the system controller of this embodiment shown in FIG. 4. As peripheral device 9 finishes this write operation, system controller 3a starts to perform a remapping operation in step S12, thereby redirecting addresses ADDR#2 dedicated to peripheral device 7 to memory segment B1 containing the data stored by peripheral device 9. As described above, system controller 3a can execute such a remapping function under the control of page/remapping management circuit 33a, which redirects any request containing addresses ADDR#1 to access memory segment B2 and redirects any requests containing addresses ADDR#2 to access memory segment B1.

Accordingly, in step S13, peripheral device 7 reads the data from memory segment B1 by using the addresses ADDR#2. From the viewpoint of peripheral device 7, it always uses addresses ADDR#2 to access memory 5. However, peripheral device 7 physically accesses memory segment B2 in the normal operating mode and physically accesses memory segment B1 in the remapping operating mode. After processing the retrieved data, peripheral device 7 writes the resulting data back to memory segment B1 in step S14 by using addresses ADDR#2.

According to the above description, advantages of the present invention are clear and will be described as follows:

1. Communication between various peripheral devices in a system does not need actual data transfer. Using the remapping function supported by the system controller, the system processor will not be involved in transaction between various peripheral devices, thereby reducing its workload.

2. Moving data from one memory segment to another memory segment inevitably wastes a lot of time. In the embodiment of the present invention, however, the data stored in a predefined memory segment can be directly accessed by the other peripheral devices that cannot access in the conventional case.

3. The above embodiment can be easily implemented. Main memory and peripheral devices (including the interface circuitry) of a computer system do not need any modification in this case. Only the system controller has changes in original page management circuit 33 and open-page address table 35. Note that access control circuit 31 remains unchanged. Conventional open-page address table 35 needs to expand its memory space to accommodate all mapping tables of open/remapped address table 35a in this embodiment. Conventional page management circuit 33 needs to add an extra circuitry that can control and use the mapping tables of open/remapped address table 35a, and redirect access requests to access proper memory segments in the remapping mode.

Figure 6:
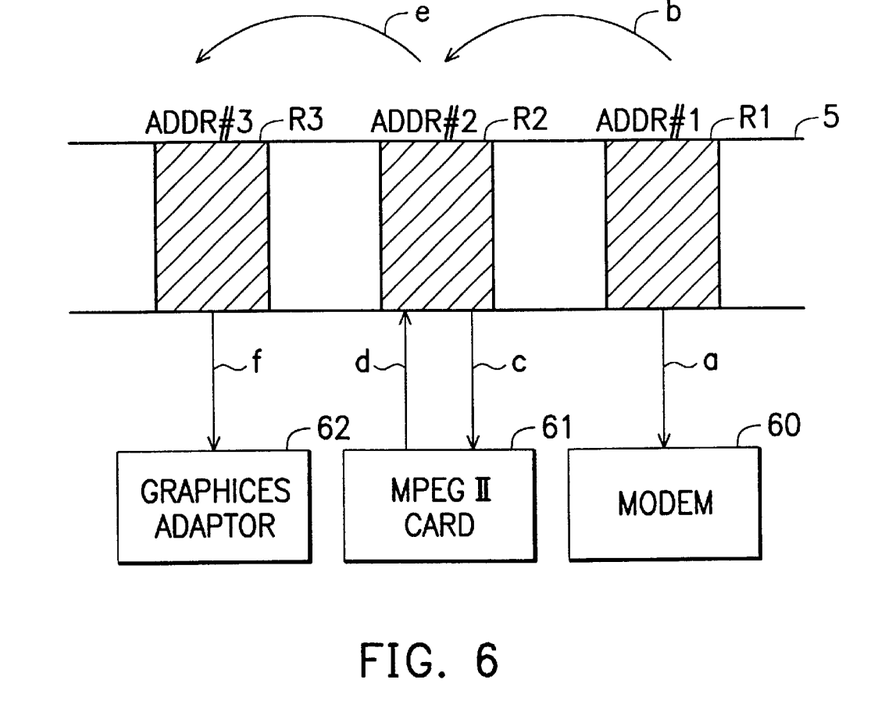
FIG. 6 shows the schematic diagram of an accessing example in which three peripheral devices are involved.

FIG. 6 shows a schematic system diagram of a practical accessing example involving three peripheral devices. As shown in FIG. 6, these peripheral devices includes modem 60, MPEG II card 61 and graphic adaptor 62. In this example, modem 60 first retrieves archived video data (encoded by MPEG II scheme) from an external site and writes them into memory 5. Then MPEG II card 61 retrieves the archived video data from memory 5 and applies the MPEG decoding scheme on these archived video data to recover the normal video data. Finally, graphic adaptor 62 displays the normal video data on a specific monitor. Therefore, in this example, the archived video data and the normal video data should be placed in the physical storage locations that these peripheral devices can properly access. Assume that the corresponding addressing ranges of modem 60, MPEG II card 61 and graphic adaptor 62 are denoted by ADDR#1, ADDR#2 and ADDR#3, respectively. In addition, memory segments R1, R2 and R3 of memory 5 are assigned to ADDR#1, ADDR#2 and ADDR#3 in the normal mode. In FIG. 6, symbols a~f sequentially indicate the data flow in this example.

Figure 7A:
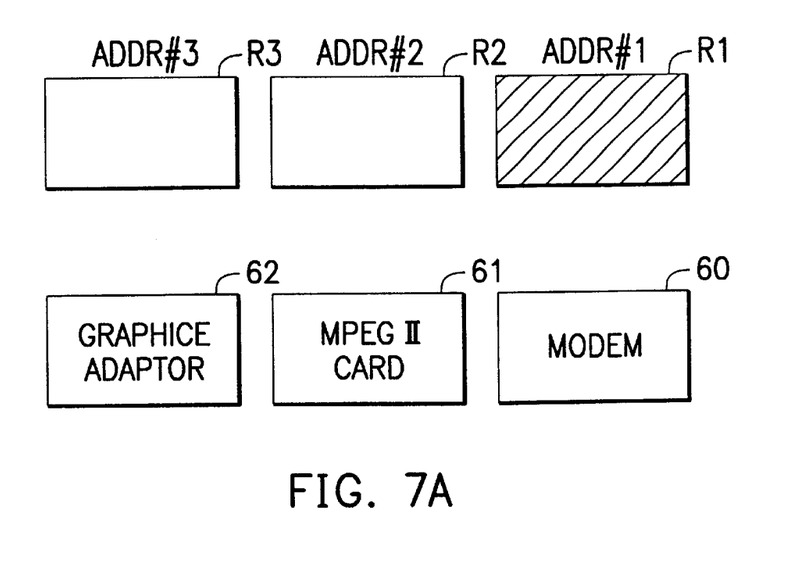
FIGS. 7A, 7B and 7C illustrate detailed operational stages of the accessing example in FIG. 6, respectively.
Figure 7B:
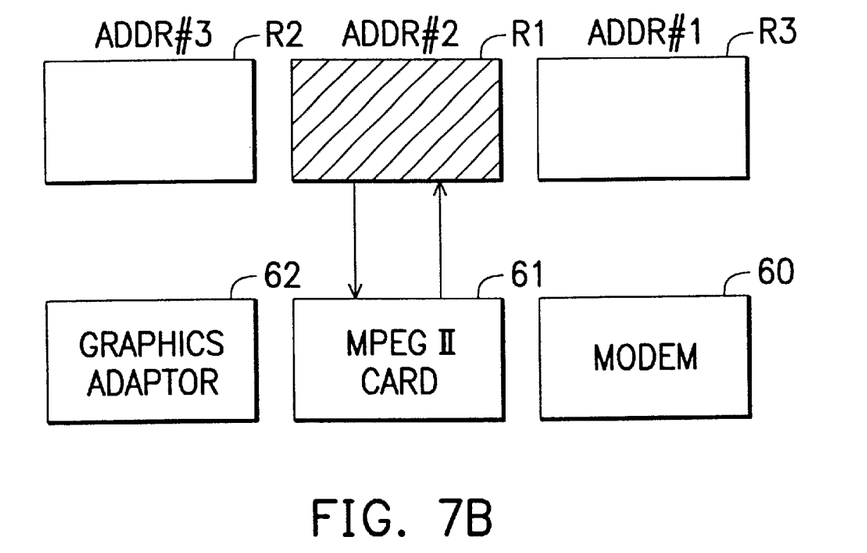
Figure 7C:
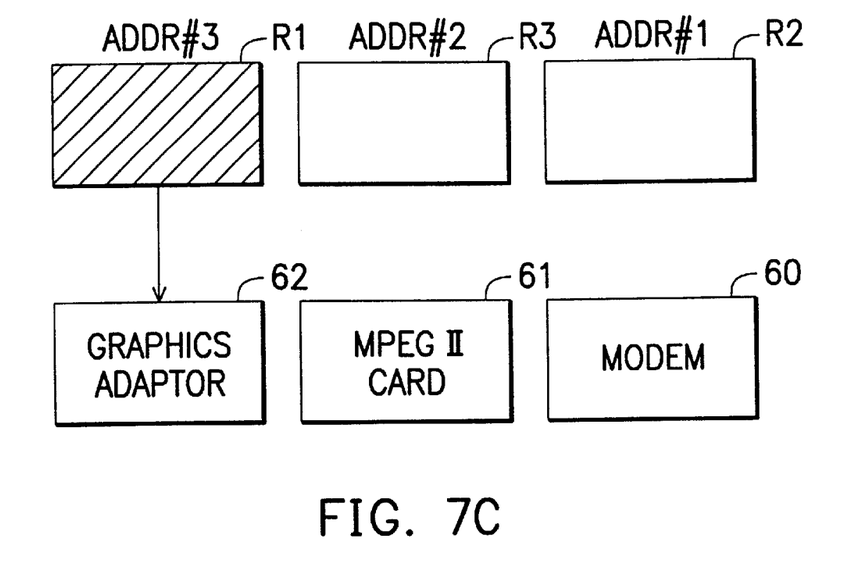

FIGS. 7A, 7B and 7C illustrate operation stages of this accessing example, in which the system controller with memory-remapping function is employed. It is noticed that there are two extra remapped modes: a first remapped mode and a second remapped mode. They will be described later in detail.

FIG. 7A illustrates the case in which the System is in the normal mode. Accordingly, modem 60 can access memory segment R1 by using its dedicated addresses ADDR#1. More specifically, modem 60 writes the archived video data, which may be downloaded from the outside, to memory segment R1. At the same time, MPEG II card 61 and graphic adaptor 62 access memory segments R2 and R3, respectively.

After modem 60 finishes its write operation, the system controller can activate a remapping process to change the current normal mode to the first remapping mode, in which memory segments R1, R2 and R3 are addressed by addresses ADDR#2, ADDR#3 and ADDR#1, respectively. It is noticed that the mapping relationship of memory segments and peripheral devices are changed. In the first remapped operating mode, MPEG II card 61 can directly access memory segment R1 by using its dedicated addresses ADDR#2. The archived video data still remain in memory segment R1. Accordingly, MPEG II card 61 can retrieve the archived video data stored in memory segment R1, decode them and write the normal video data to memory segment R1, as shown in FIG. 7B.

After MPEG II card 61 completes its task, the system controller can activate a remapping process to switch to the second remapped operating mode, in which memory segments R1, R2 and R3 are addressed by the addresses ADDR#3, ADDR#1 and ADDR#2, respectively. Now graphic adaptor 62 can directly access memory segment R1 by using its dedicated addresses ADDR#3. Notice that data still remain in memory segment R1. Accordingly, graphic adaptor 62 can retrieve the normal video data from memory segment R1 and display them on the display monitor, as shown in FIG. 7C.

The three phases shown in FIGS. 7A, 7B and 7C form a working cycle that can be recursively executed until all data are processed. Obviously, the presented access scheme is better than the conventional case. The system processor is not involved and it is not required to actually transfer data between different memory segments.

Return to FIG. 4, control signal CTRL for informing the page/remapping management circuit 33a of mode-related information is briefly explained. As described above, control signal CTRL is used to indicate the current operating mode required. For example, in the accessing example shown in FIG. 6, control signal CTRL may be issued when modem 60 finishes data-writing operation, or when MPEG II card 61 finishes data-processing operation, or when graphic adaptor 62 finishes data-retrieving operation. The most proper method for maintaining data integrity is to wait until all peripheral devices have finished the required tasks in each phase before performing any remapping operation. In the above case, however, it is clear that MPEG II card 61 usually requires more processing time than other peripherals. Therefore, control signal CTRL can also be activated in response to the processing status of MPEG II card 61. In addition, it is preferable that these memory segments mapped to these peripheral devices should be located in different memory banks, and can be accessed simultaneously.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A data-processing system comprising:
    a memory device having first physical storage locations and second physical storage locations;
    a first peripheral device for accessing the memory device by a first set of addresses dedicated to the first peripheral device;
    a second peripheral device for accessing the memory device by a second set of addresses dedicated to the second peripheral device; and
    a system controller, coupled to the memory device, the first peripheral device and the second peripheral device, for mapping the first set of the addresses dedicated to the first peripheral device to the first physical storage locations and mapping the second set of the addresses dedicated to the second peripheral device to the second physical storage locations in a first mode, the system controller being switched to a second mode in which the second set of the addresses dedicated the second peripheral device is mapped to the first physical storage locations in response to a first control signal; wherein the first control signal is activated in response to the case that the first peripheral device finishes writing data to the first physical storage locations; and the second peripheral device reads the data written by the first peripheral device from the first physical storage locations in the second mode.

2. The data-processing system as recited in claim 1, wherein the system controller maps the first set of the addresses dedicated to the first peripheral device to the second physical storage locations in the second mode.

3. The data-processing system as recited in claim 1, wherein the system controller is switched from the second mode to the first mode in response to a second control signal.

4. The data-processing system as recited in claim 3, wherein the second control signal is activated in response to the case that the second peripheral device finishes accessing the first physical storage locations in the second mode.

5. A system controller for bridging peripheral devices to which a plurality of sets of addresses are respectively dedicated and a memory device that has a plurality of sets of physical storage locations, comprising:

accessing means, coupled between the peripheral devices and the memory device, for actually accessing the memory device according to access requests issued by the peripheral devices;

storage means for storing a first mapping table and a second mapping table indicating mapping relationship between the sets of the physical storage locations and the sets of the addresses in a first mode and in a second mode, respectively; and controlling means, coupled between the accessing means and the storage means, for selecting one from the first mapping table and the second mapping table responsive to a control signal, and cooperating with the accessing means in actually accessing the memory device according to the selected mapping table; wherein the control signal is activated to drive the controlling means to select the second mapping table when the peripheral devices finish operations on the sets of the physical storage locations mapping to the dedicated sets of the addresses in the first mode, respectively.

6. The system controller as recited in claim 5, wherein the control signal is activated to drive the controlling means to select the first mapping table when the peripheral devices finish operations on the sets of the physical storage locations mapping to the dedicated sets of the addresses in the second mode, respectively.

7. The system controller as recited in claim 5, wherein the control signal is issued when one of the peripheral devices finishes a data-processing operation on the corresponding set of the physical storage locations.

\* \* \* \* \*